United States Patent [19]
Jenkins

[11] 3,873,739
[45] Mar. 25, 1975

[54] FOODS CONTAINING RED DYE

[75] Inventor: Frederick Peter Jenkins, Bedford, England

[73] Assignee: Lever Brothers Company, New York, N.Y.

[22] Filed: Mar. 14, 1974

[21] Appl. No.: 451,330

Related U.S. Application Data

[63] Continuation of Ser. No. 248,179, April 27, 1972, abandoned.

[52] U.S. Cl.............. 426/164, 426/167, 426/177, 426/190, 426/196, 426/212, 426/224, 426/250
[51] Int. Cl............................................. A23l 1/26
[58] Field of Search ........... 426/268, 177, 250, 164, 426/167, 190

[56] References Cited
FOREIGN PATENTS OR APPLICATIONS
1,270,656   4/1972   United Kingdom ............ 426/177

*Primary Examiner*—Samih N. Zaharna
*Assistant Examiner*—J. M. Hunter
*Attorney, Agent, or Firm*—Arnold Grant, Esq.

[57] ABSTRACT

A red colour for use in a foodstuff composition comprises 8-acetamido-2-(azo-benzene-4'-sulphonic acid)-1-naphthol-3, 6-disulphonic acid and salts thereof. The colour is stable to sulphite and sulphur dioxide preservatives and is biologically safer than known red dyes.

4 Claims, No Drawings

FOODS CONTAINING RED DYE

This is a continuation of application Ser. No. 248,179, filed Apr. 27, 1972, now abandoned.

This invention relates to food colours.

There is a shortage of red dyes which are suitable for use in foodstuffs and which satisfy stringent requirements of biological safety. In the case of some foodstuffs such as sausages the range of dyes is further limited because of the requirement for stability in the presence of sulphite and sulphur dioxide which are widely used as preservatives.

We have found that the dyestuff 8-acetamido-2-(azo-benzene-4'-sulphonic acid)-1-naphthol-3, 6-disulphonic acid of formula

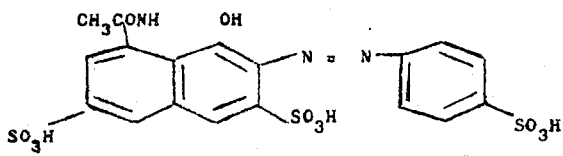

and its edible salts not only have a good red colour stable in foodstuffs preserved with sulphite or sulphur dioxide but are biologically satisfactory. The dyestuff, whether in acid or salt form, is referred to in the present specification as Red SA.

The invention accordingly provides foodstuffs and dentifrices containing colouring amounts of Red SA, and a method of colouring foodstuffs and dentifrices in which colouring amounts of Red SA are added to them. Particular foodstuffs which may be coloured are sausage meats, soft drinks such as carbonated drinks, dry mixes for rehydration to soft drinks, ice creams, salad dressings and jams.

Red SA has been found to have a satisfactory red colour over a wide range of pH. The form in which the dye is used depends on its pH, and can be a mixture of one or more of the free acid and the mono-, di- and tri-alkali metal salts.

The Red SA can be used in amounts of 1 to 200 parts per million based on the weight of ready-for-consumption foodstuff or drink. In the case of sausage meats, the preferred level of use is 5 to 12 ppm to achieve an attractive pink colour. The level of use in dentifrices is preferably 40 to 200 ppm. In general the Red SA is used in slightly greater amounts than amaranth (Red No. 2) for example four times as much in a soft drink mix but in less amounts than cochineal (Red SA).

No undesirable biological effects of Red SA have been found, and in particular it has not been found to cause Heinz bodies. The formation of Heinz bodies is the only known undesirable biological effect of the dyestuff Red 2G, which is structurally similar to Red SA and which is the red dye presently regarded as providing the best colour in foodstuffs such as sausage meat in the presence of sulphite.

Preparation and Purification of Red SA

Two alternative methods for the preparation and purification of Red SA are described.

Method (a)

Sulphanilic acid 4.3 gms was dissolved in water (55 mls) containing an equivalent of sodium carbonate (2.65 gms). The solution was cooled to 5°C and to it was added a solution of 1.73 gms of sodium nitrite in 10 mls. of water at 5°C. The resultant solution was then added to 16 mls. of 5N hydrochloric acid at 5°C. After reaction excess nitrous acid was shown to be present by starch iodide paper. The diazonium salt was then added below the surface to a solution of 10 gms. of 8-acetamido-1-naphthol-3,6-disulphonic acid in 50 mls. of water containing 2.65 gms of sodium carbonate, the whole reaction mixture being maintained at 5°C. One minute after the addition was complete 5 mls. of 0.880 ammonia were added and the mixture was stirred for two hours and then left to stand overnight. The solution was acidified with acetic acid to a pH of 4 to 5 and heated to 80°C during the course of one hour and maintained at this temperature for an additional hour. A saturated solution of common salt was then added to precipitate the dye at about pH 7. The solution was cooled and filtered, and the filtered solid dried, to give the crude dye. (13.0 gms., chloride content 7.4%, molar extinction co-efficient $\epsilon$ at $\lambda$ max 505, 525 m$\mu$ = 24,100).

The crude dye (13 gms.) was then added to water (450 ml.) containing 40 gms. of sodium chloride, and the mixture heated to 80°C and maintained at this temperature until all the solids present had dissolved. The solution was cooled and the precipitated dye filtered and dried to give the purified dye (9.6 gms., 71% based on sulphanilic acid, chloride content 1.7%, molar extinction coefficient $\epsilon$ at $\lambda$ max 505, 525 m$\mu$ = 27,000). Examination of the Red SA by paper chromatography (Whatman No. 1, solvent 0.880 ammonia diluted × 3) detected one major red spot (Rf 0.74).

Tested comparably to the British Standard B.S. 3611:1963 for Red 2G, the Red SA produced gave the following results:

| | | | (Standard not more than 10%) | |
|---|---|---|---|---|
| Matter volatile at 135°C | | 7.1% | by weight | |
| Matter insoluble in water | | 0.1% | " | (" ) |
| Matter soluble in di-isopropyl ether | | 0.16% | " | (" 0.2%) |
| Subsidiary dyes | less than | 0.3% | " | (" 2.0%) |
| Sulphanilic acid | less than | 0.002% | " | (" 0.2%) |
| Chloride and Sulphate (as sodium salts) total | | 2.62% | " | (" 8.0%) |
| Total dye content (based on trisodium salt) | | 83% | | (" 82%) |
| Copper | | 8 ppm | | (" 10 ppm) |
| Arsenic | less than | 0.6 ppm | | (" 1.0 ppm) |
| Lead | | none | | (" 10 ppm) |
| Heavy metals (as sulphides) | | undetectable by method of standard | | undetectable by method of standard |

Method (b)

Sulphanilic acid (14.4 gms) was dissolved in water (330 mls) containing an equivalent quantity of sodium carbonate (4.42 gms). The solution was cooled to 5°C and added to a 1M solution of sodium nitrite (76 mls) at 5°C. This solution was then added to 5N hydrochloric acid (32 mls.) also at 5°C. After reaction excess nitrous acid was shown to be present by starch iodide paper.

The diazonium salt was added to a solution of the 8-acetamido-1-naphthol-3,6-disulphonic acid previously prepared, by dissolving 30 gms. in 2N sodium hydroxide (125 mls) at 5°C. The reaction mixture was stirred for 15 to 30 minutes before being neutralised to pH 7 by the addition of 5N hydrochloric acid.

The dye solution as prepared above was evaporated to dryness to give a crude solid (52 gms., chloride content 18%; molar extinction coefficient $\epsilon$ at $\lambda$ max 505, 525 m$\mu$ = 16,350). The crude solid was suspended in refluxing absolute ethanol (500 mls) and water was added (250 mls) until almost all the solid dissolved. The solution was decanted off and allowed to cool at room temperature overnight. The precipitated dye was filtered off and dried (28 gm: yield 62% based on sulphanilic acid; chloride content 3.2%; $\epsilon$ at $\lambda$ max 505 and 525 m$\mu$ = 24,000). Examination of the Red SA by paper chromatography (Whatman No. 1, solvent 0.880 ammonia diluted × 3) showed that the dye ran as a red spot Rf 0.74 as before. A 1 gm sample run down a Sephadex G 10 column showed no increase in and no component other than Red SA could be isolated.

In all the following tests, the Red SA was used in the form in which it precipitated in the purification process of method (a), i.e. at about pH 7.

Sulphur dioxide stability test

A standard solution (1 litre) of sulphur dioxide (1600 ppm) was made up using potassium metabisulphite (3.08 gm). The sulphur dioxide content was determined using the method of Reith and Willems (Zeitschrift fur Lebensmittel-Untersuchung und-Forschung 108 (3) 270 (1958)). In the method the sulphur dioxide is liberated by orthophosphoric acid and distilled into dilute hydrogen peroxide to oxidise it to sulphuric acid, which is determined by titration with standard alkali. Bromophenol blue is used as indicator. A standard solution of the dye was made up (50 ppm allowing for salt content) and tested at a concentration of 10 ppm with sulphur dioxide concentrations of 400 and 700 ppm in daylight for 48 hours. The solutions for testing were made up using the following quantities of the standard solutions:

1. 400 ppm of sulphur dioxide; 25 ml of standard sulphur dioxide solution plus 20 ml standard dye solution, volume made up to 100 ml.
2. 700 ppm of sulphur dioxide solution; 44 ml of standard sulphur dioxide solution plus 20 ml of standard dye solution volume made up to 100 ml.

The results were that no fading of the dye occurred even if the test was prolonged to 7 days.

Biological Test on g

Red SA was fed as described below to 4-week old rats at 0.48% of their diet for 11 days and compared with Red 2G and sulphanilic acid, which were fed at equivalent molecular levels of 0.4% and 0.136% respectively.

Purified diet (by weight)
| | |
|---|---|
| Vitamin B supplement | 5% |
| Cellulose powder | 4% |
| Salt mixture (Jones Foster) | 4% |
| Groundnut oil | 10% |
| Wheat germ oil | 0.5% |
| Casein | 24.6% |
| Starch | 51.9% |

Procedure and Results

The rats were dosed orally with vitamins A and D at the start of the test and the diets were fed ad libitum. Food intake was recorded and rats were weighed on days 0, 7 and 11.

Blood was taken from the tail on days 5 and 7 and examined for Heinz bodies. These are damaged red cells in which certain dark bodies appear. The production of Heinz bodies is the only known undesirable physiological effect of the dyestuff Red 2G. Blood was taken from the heart on killing on day 11 and examined for Heinz bodies, methaemoglobin, packed cell volume and haemoglobin.

The rats, which were observed frequently, showed no signs of toxic effects and their feeding, growth and weight were normal. The faeces of rats fed dyes were invariably black; the faeces of rats fed purified diet alone of the diet containing sulphanilic acid were pale brown.

Examination of the blood samples from every rat on day 5, 7 and 11 revealed Heinz bodies only in the red cells of rats fed Red 2G; 3 out of 4 of the rats were affected on each occasion. As a consequence of this effect of Red 2G the spleens of these rats were enlarged. Splenic enlargement was not observed in the other groups at autopsy. Subsequent histological studies revealed a marked increase in splenic erythropoiesis, sinusoidal engorgement and haemosiderin content in rats fed Red 2G, but adverse effects were not observed in animals fed Red SA or sulphanil sulphanilic acid. Examination of the liver demonstrated increased erythropoiesi and haemosiderin content only in animals fed Red 2G.

Methaemoglobins on day 11 were only appreciably higher than controls (rats fed purified diet alone) for rats fed Red 2G. Packed cell volumes and haemoglobins on day 11 were not affected by any of the treatments.

It was accordingly concluded that Red SA, unlike Red 2G, does not affect the blood in test administration, and that sulphanilic acid, a metabolite of Red SA, does not affect it either. No other undesirable physiological effect than Heinz body production is known of Red 2G, and none was observed for Red SA.

The metabolism of the dyes by intestinal bacteria was investigated and the results are given below.

Metabolism of Red SA by intestinal bacteria

The contents of 3 rat caeca were mixed with 300 ml saline at 37°C and filtered through cotton wool. One half of the filtrate was sterilised by heating at 100°C for 30 minutes.

Mixtures of the unsterilised filtrate (20 ml) and dye (8 mg in 2 ml saline) were incubated at 37°C. Samples were removed for analysis at 0, 4 and 20 hours. The sample was diluted (1 in 21) with saline and the optical density was measured at 530 m$\mu$ before and after adding a few crystals of sodium dithionite. The same procedure was followed using the sterilised filtrate. The results are given below in Table 1 and the percentage metabolism of dyes, calculated from the results, is given in Table 2.

Table 1

| | Change in optical density on dithionite addition. | | | | | |
|---|---|---|---|---|---|---|
| | Sterilised | | | Not Sterilised | | |
| Red SA | 0 hr. | 4 hr. | 20 hr | 0 hr | 4 hr | 20 hr |
| | 0.78 | 0.76 | 0.67 | 0.66 | 0.44 | 0.07 |

Table 2

| | Sterilised | | Not Sterilised | |
|---|---|---|---|---|
| Red SA | 4 hr. | 20 hr | 4 hr | 20 hr |
| | 1.6 | 13.4 | 33.4 | 89.4 |

This demonstration of the rate of metabolic breakdown indicates that the live animals consuming the Red SA were exposed to the metabolic products. Not only Red SA but its metabolic products also have no effect on the rats.

Sulphanilic acid was detected in the incubated filtrate, showing that it is indeed a metabolite of Red SA.

The invention is illustrated by the following Examples.

EXAMPLE 1

Sausage meat was prepared from the following ingredients:
Formulation (by weight):

| lean shoulder pork | 33.0% | 1760 | g. |
| pork back fat | 33.0% | 1760 | g. |
| sausage rusk | 10.8% | 576 | g. |
| water | 21.6% | 1152 | g. |
| salt | 1.3% | 67.2 | g. |
| white pepper | 0.12% | 6.24 | g. |
| cayenne pepper | 0.08% | 4.38 | g. |
| potassium metabisulphite | 0.09% | 4.56 | g. |

The lean meat seasoning and preservative were mixed by chopping in a nowl chopper for ½ minute. The water containing the Red SA to be tested (to give 5 and 10 ppm) was then added slowly and chopped in for 1½ minutes. The rusk was then added and chopping continued for a further 1 minute. Finally the fat was added and the whole mix was chopped for 2 minutes before stuffing into artificial casing using a small horizontal stuffer. The sausages were linked by hand (12 to the lb). Half pound samples were packed into quasipermeable regenerated cellulose film for storage.

Control packs were stored at −2°C in the dark. Experimental packs were stored by day at ambient temperature under 'daylight' strip lights, and at night at 2 °C in the dark, and were compared for fading after 2 and 5 days' storage. Cooked colours (internal) were compared after 15 minutes' frying.

The results were entirely satisfactory. The stored experimental packs did not change in colour or fade, and the cooked colours were the desired grey-brown.

EXAMPLE 2

Commercial preparation of sausage meat containing Red SA 0.9 Kg of skim milk powder was placed in a vessel equipped with a mechanical stirrer and 4.5 l of water containing 0.45 gm of Red SA were added. The mixture was stirred thoroughly for 3 minutes and then added to 15 Kg of lean pork meat in a bowl chopper.

The meat was chopped, 0.57 Kg salt, 0.1 Kg seasoning and a further 4.5 l of water being added as the chopping commenced and 4.17 Kg rusk with 15 Kg fat pork after 2 minutes, total chopping time being 3 minutes.

The product was approximately 45 Kg sausage meat containing 10 ppm Red SA.

The dye may be added in water if desired rather than bound to milk powder in emulsion form as above.

EXAMPLE 3

A transparent red toothpaste was prepared according to Example 7 of U.S. Pat. No. 3,538,230, except that in place of the "dye solution (red)" 1.4% of a 1.0% solution of Red SA were incorporated in the toothpaste, giving a concentration of 140 ppm Red SA in the toothpaste. The toothpaste had an attractive red colour, similar to that obtained using amaranth at the same colour intensity.

What is claimed is:

1. A foodstuff composition colored by a physiologically acceptable amount of a red dye selected from 8-acetamido-2-(azo-benzene-4'-sulphonic acid)-1-naphthol-3,6-disulphonic acid and edible salts thereof.

2. A coloured foodstuff according to claim 1 containing 1 to 200 parts per million of the dye based on the weight of ready for consumption foodstuff.

3. A foodstuff according to claim 2 comprising sausage meat coloured by 5 to 12 parts per million of red dye.

4. A coloured foodstuff according to claim 2 wherein the foodstuff selected from soft drinks dry mixes for rehydration to soft drinks ice creams salad dressings and jams.

* * * * *